April 19, 1927.
R. H. REECE
1,624,975
TIMER FOR IGNITION SYSTEMS AND THE LIKE
Filed Aug. 8, 1923
4 Sheets-Sheet 2
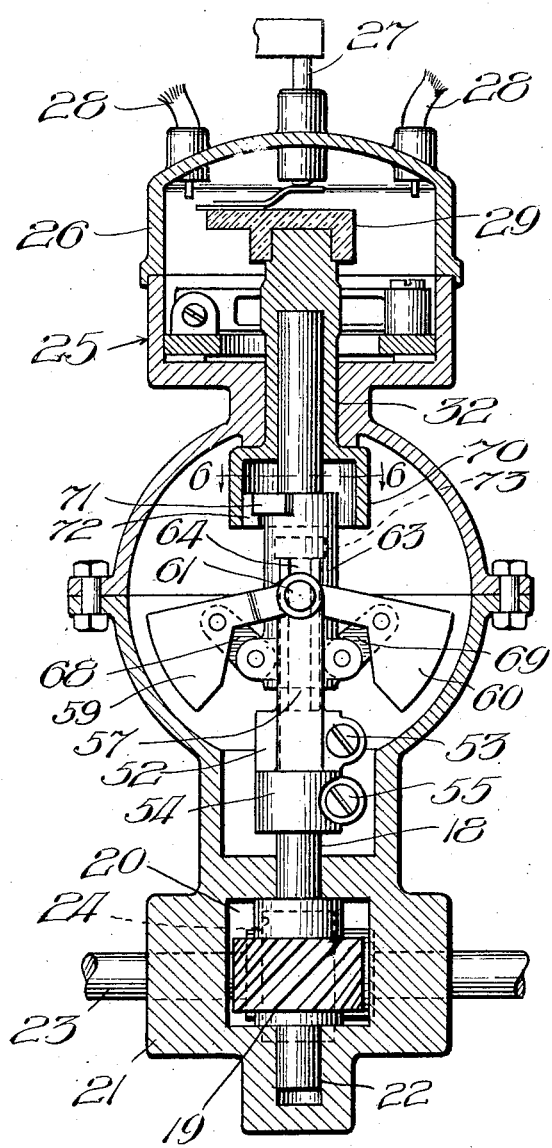
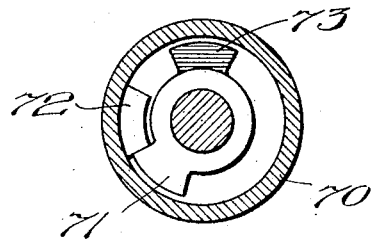
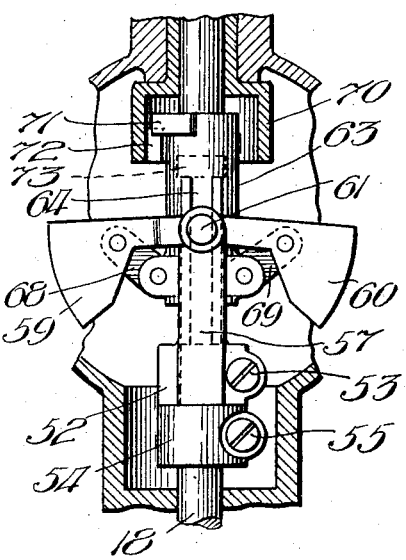
Inventor:
Raymond H. Reece

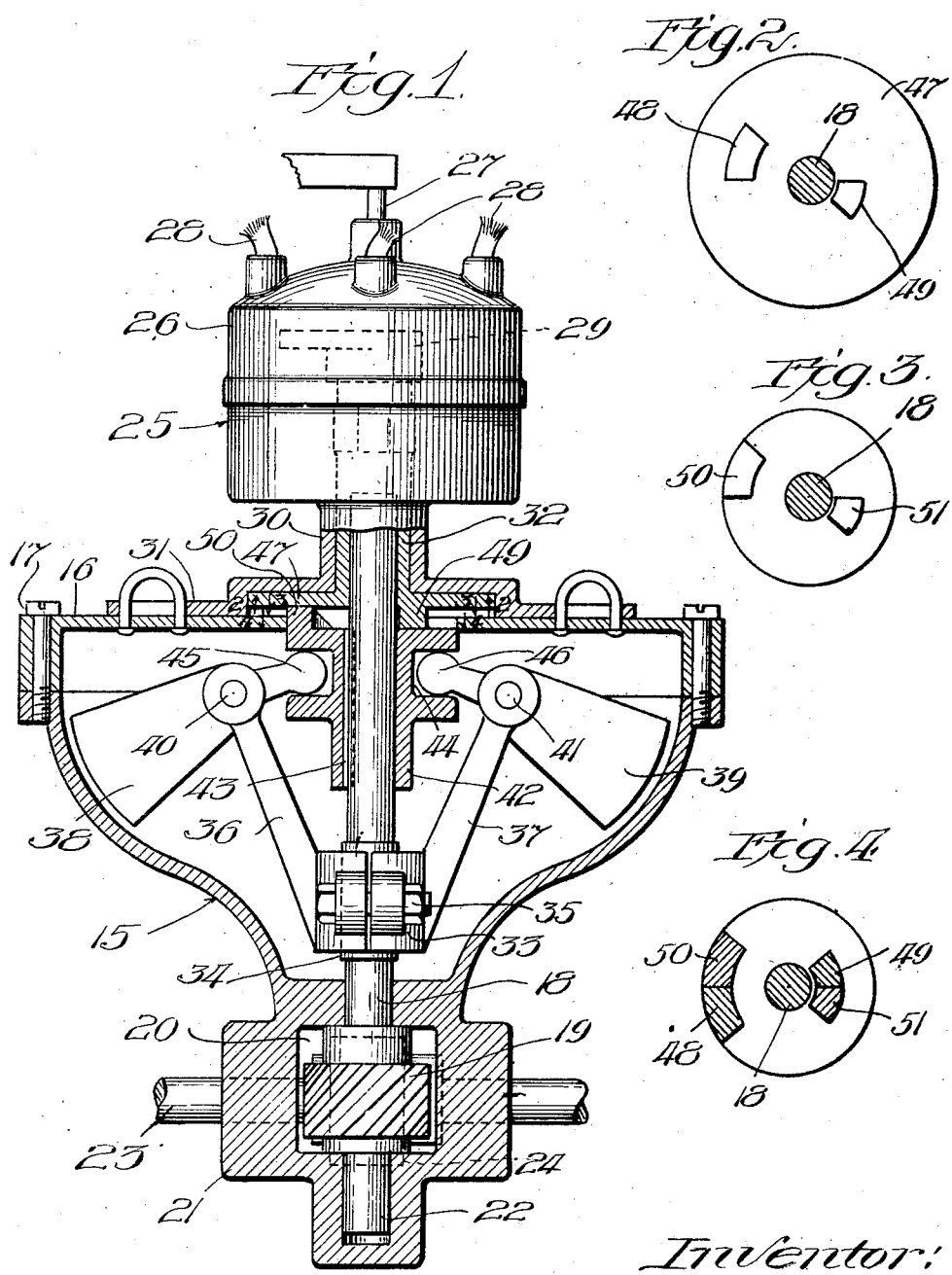

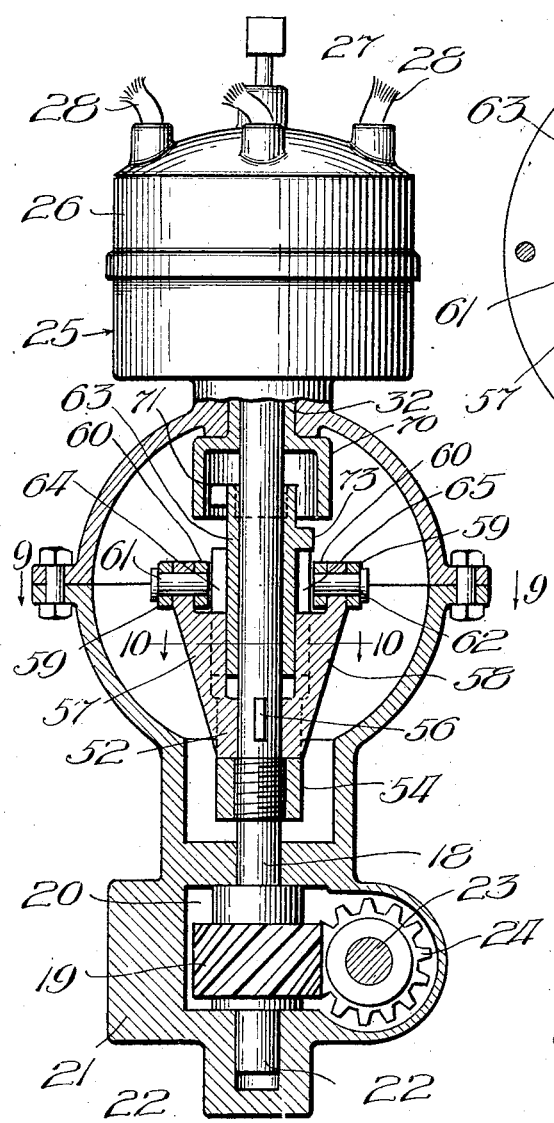

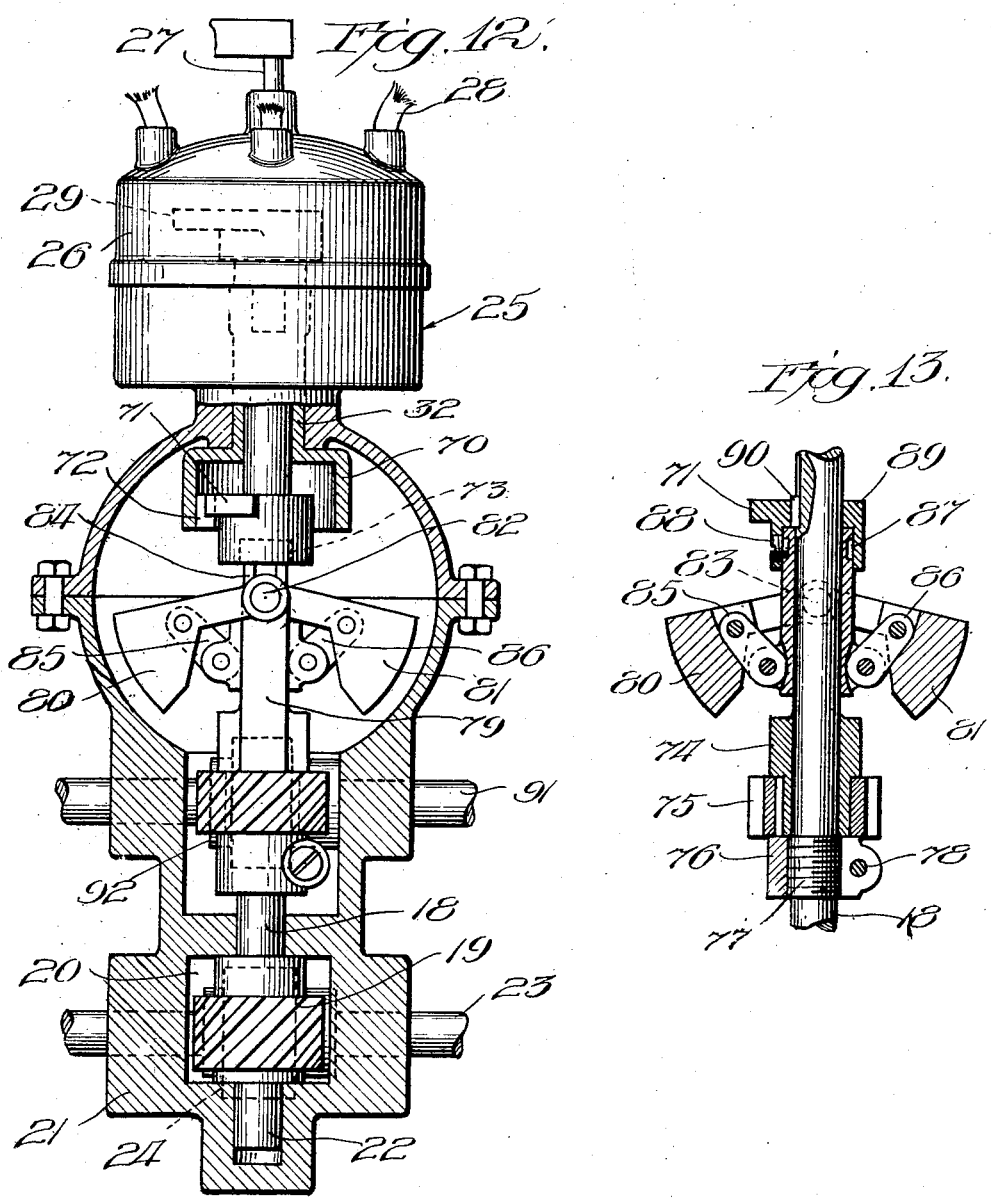

Patented Apr. 19, 1927.

1,624,975

UNITED STATES PATENT OFFICE.

RAYMOND H. REECE, OF JOLIET, ILLINOIS.

TIMER FOR IGNITION SYSTEMS AND THE LIKE.

Application filed August 8, 1923. Serial No. 656,337.

This invention has to do with certain improvements in timers for the ignition systems of internal combustion engines. The invention has reference particularly to improvements in the construction of the timer, and the parts related thereto whereby the effective operation of the timer is discontinued or interfered with when the speed reaches a predetermined value so as to prevent excessive speed by disabling the effective operation of the distributor system.

In connection with the foregoing it is an object of the invention to provide a centrifugal regulator whose operation is dependent upon the speed of the device whose speed is to be a determining factor, which centrifugal element operates at the critical speed to throw the timer out of proper operation.

A further object of the invention is to provide an arrangement which can be used for throwing the distribution system out of effective operation when the engine speed itself becomes excessive or when the speed of the vehicle exceeds the desired limit. In connection with the foregoing, it will be understood that the engine speed and the speed of the vehicle are not necessarily proportionate since ratio between these speeds necessarily depends upon the overall gear ratio between the engine shaft and the driving wheels. As the speed change gears are placed in different combinations this ratio is correspondingly modified.

In many cases the desire to control or limit speed is dictated by a desire to limit the speed of the vehicle itself, since naturally the speed of the engine is of little importance as far as public safety and welfare on the highways are concerned. Ordinarily, the engine speed in direct drive when the vehicle is traveling at the maximum speed which it is desired to allow, will be considerably below the best engine speed for hard pulling. Consequently, if the limit of vehicle speed in direct drive is established by limiting the engine speed, it will not be possible to secure the best power and operation from the engine in times of emergency and when operating in low gear.

For the foregoing reasons, it is a further object of the invention to make effective provision for causing the operation of the centrifugal disabling mechanism to be brought about by the speed of the vehicle itself so as to leave the engine free to operate at any speed which may be called for at any time, provided only that the speed of the vehicle is not excessive.

More particularly the centrifugal mechanism operates to destroy the proper timing of the distributor block when the speed reaches the critical limit, so that the proper firing of the cylinders is destroyed. In connection with this feature, it is an object to make provision for throwing the distributor block out of proper time without, however, allowing it to come to rest, but, on the contrary, maintaining its full speed of operation but out of time. Under these conditions, as soon as speed is no longer excessive the distributor block will be brought into proper time without the need of suddenly accelerating and bringing it up to full speed with a jerk.

Other objects and uses of the invention will appear from a detailed description of the same, which consists in the features of construction and combinations of parts hereinafter described and claimed.

In the drawings:

Figure 1 shows a vertical section through a construction of timer and distributor embodying the features of the present invention, which construction is, however, such that when the critical speed is reached the distributor head is entirely disconnected from the driving shaft;

Fig. 2 shows a fragmentary section on the line 2—2 of Fig. 1, looking in the direction of the arrows;

Fig. 3 shows a fragmentary section on the line 3—3 of Fig. 1, looking in the direction of the arrows;

Fig. 4 shows a fragmentary section on the line 4—4 of Fig. 1, looking in the direction of the arrows;

Fig. 5 shows a vertical longitudinal section through a modified form of construction in which the rotation of the distributor head is not permitted to cease when the speed becomes excessive, but in which construction the distributor block is thrown out of time under those conditions;

Fig. 6 shows a fragmentary section taken on the line 6—6 of Fig. 5, looking in the direction of the arrows;

Fig. 7 shows a fragmentary section similar to that of Fig. 5, but with the centrifugal wings in a partially raised position;

Fig. 8 shows a view similar to that of Fig. 5, but at right angles thereto;

Fig. 9 shows a horizontal section on the line 9—9 of Fig. 8, looking in the direction of the arrows;

Fig. 10 shows a fragmentary section on the line 10—10 of Fig. 8, looking in the direction of the arrows;

Fig. 11 shows a longitudinal section through the lug sleeve;

Fig. 12 shows a vertical longitudinal section through a modified form of construction in which the speed of the vehicle or of some element other than the engine is the controlling factor; and Fig. 13 is a fragmentary view corresponding to Fig. 12, with the exception that the lug sleeve is shown in longitudinal section.

Referring first to the construction shown in Figs. 1, 2, 3 and 4, I have provided a housing 15, preferably circular, within which the centrifugal elements are placed, the top of this housing being conveniently closed by a cover plate 16 and held in place by the tap screws 17.

Extending vertically through the housing is the drive shaft 18 on whose lower end is placed a spiral gear 19 working in a chamber 20 of the base portion 21 of the housing. The lower end 22 of the shaft 18 is preferably socketed in the bottom of the base portion. A shaft 23 passes through the base portion 21 at right angles to the drive shaft 18 and carries a spiral gear 24 which meshes with the spiral gear 19 and drives the same. The shaft 23 is driven in proper time with respect to the crank shaft of the engine in any suitable manner.

The distributor housing 25 is located above the position of the centrifugal housing 15. This distributor housing 25 is closed by a cap 26 having the central high tension connection 27 together with the usual high tension connections 28 for the various spark plugs. The distributor block 29 rotates within this housing 25 and distributes the high tension current to the spark plug connections in proper sequence.

As a matter of convenience, the housing 25 is shown as carried by a sleeve 30 which has on its lower end a flange 31 which rests upon and is connected to the cap member 16 in any convenient manner.

The drive shaft 18 preferably extends up to a point within the sleeve 30 so as to provide ample and convenient support for a timing sleeve 32. This timing sleeve carries the distributor block 29 at its upper end, and the lower end of the timing sleeve is to be driven in proper time with respect to the drive shaft 18, but can be disconnected from such driving connection when the speed of the engine becomes excessive.

A split collar 33 is drivingly mounted upon the shaft 18 at a position in the lower portion of the housing 15. For this purpose the shaft 18 is preferably enlarged slightly as shown at 34, and the split sleeve 33 is provided with a tie bolt 35 by means of which it may be tightened after its position on the portion 34 has been adjusted. By loosening up the bolt 35 and turning the split sleeve it can be set up or down on the shaft 18.

The split sleeve 33 carries a pair of upstanding outwardly reaching governor arms 36 and 37. The centrifugal fly balls 38 and 39 are pivoted to the upper ends of the arms 36 and 37, as shown at 40 and 41. A collar 42 is splined on the shaft 18 by a key 43, so that said collar can be raised and lowered on the shaft while maintaining its driving connection thereto. This collar has the annular groove 44 which receives the inwardly extending fingers 45 and 46 of the fly balls 38 and 39, so that the swinging of these fly balls will raise or lower the sleeve 42.

The timing sleeve 32 has on its lower end a flange 47 and downwardly extending therefrom are a pair of lugs 48 and 49, preferably placed at diametrically opposite positions. The collar 42 has on its upper end the upwardly reaching lugs 50 and 51 which are also preferably placed at diametrically opposite points.

The lugs 50 and 51 are so positioned that they may engage the lugs 48 and 49 respectively when the collar 42 is sufficiently raised, but will disengage therefrom when said collar 42 is sufficiently lowered by increase of engine speed. Furthermore, the lug 48 is placed at a greater radius from the center of rotation than is the lug 51, so that when the disengagement takes place the lug 51 can travel past the lug 48 without interference. In similar manner the lug 50 is placed at a greater radius than the lug 49 from the center of rotation, so that these two lugs will also not interfere when the disengagement takes place. Conversely, as soon as the collar 42 is sufficiently raised by the subsequent reduction of engine speed the lug 50 will necessarily engage the lug 48, so that the re-engagement of the parts will take place in proper time.

Considering the construction in Figs. 5 to 11 inclusive, in this case the drive shaft 18 carries the split sleeve 52 which can be tightened by the lug bolt 53; and another split sleeve 54 is threaded upon the shaft 18, so that by turning it, it can be raised and lowered and then locked in the new position by the lug bolt 55. The split sleeve 52 is, however, splined to the shaft 18 by the key 56 as shown in Fig. 8, so that this sleeve is compelled to rotate in proper time with the shaft.

The sleeve 52 carries the arms 57 and 58 located at diametrically opposite points; and the fly balls 59 and 60 are pivoted to the upper ends of these arms by the pins 61 and 62. These fly balls are preferably of U-shaped form as clearly shown in Fig. 9.

Another sleeve 63 is slidably mounted on the shaft 18, and at its sides it is grooved as shown at 64 and 65 in Fig. 10, so as to receive the tongues 66 and 67 of the arms 57 and 58 respectively. Consequently, the sleeve 63 is compelled to rotate in proper time with the shaft 18 while being allowed to rise or fall with respect thereto. A pair of links 68 and 69 extend between the fly balls 59 and 60, and the lower end of the sleeve 63, so that as the speed increases the sleeve is raised.

In the present construction the timing sleeve 32 carries at its lower end an enlarged flange 70 which surrounds the upper portion of the sleeve 63. A pair of lugs 71 and 73 project sidewise from the upper end of the sleeve 63 and are adapted to engage the inwardly projecting lug 72 on the flange 70 depending upon the raising or lowering of the sleeve 63.

Normally, the lug 71 of the sleeve 63 bears against the lug 72 of the flange 70 and thus drives the timing sleeve 32 in proper time. When, however, the critical speed is reached, the sleeve 63 is raised sufficient to disengage its lug 71 from the lug 72 and when this happens, the timing sleeve 32 will fall back out of time, so that the proper firing relation will be destroyed. As the rotation of the drive shaft 18 continues, its lug 73 will pass around and pick up the lug 72, so that the rotation of the timing sleeve will continue but out of time. Under these conditions, the engine will not fire properly, but the distributor head will continue to rotate at the same speed as the engine.

As soon as the speed of the parts is sufficiently reduced the sleeve 63 will drop down again and allow the lug 73 to pass away from the lug 72 and the timing sleeve 32 will then fall back a further distance with respect to the drive shaft 18 until the lug 71 again picks up the lug 72. When this occurs the driving of the distributor block will be resumed in proper timing relation.

It is thus evident with this arrangement that the rotation of the distributor block is not discontinued, but is simply thrown out of time, so that when the speed has been reduced the rotation of the distributor block will be resumed without the sudden jerk and strain which would be caused by suddenly bringing it up to full speed rotation. In this connection, it will be noted that the relation of the lug 72 to the lugs 71 and 73 is such that the lug 72 is never allowed to pass completely between the lugs 71 and 73, but rather the relationship of the parts is similar to that of an escapement mechanism in a clock.

Considering the form shown in Figs. 12 and 13, in this case the drive shaft 18 is driven in proper timed relation to the engine by the shaft 23 and spiral gears 19 and 24. In this case the timing sleeve 32 also carries at its lower end the flange 70 having the lug 72 similar to the arrangement described in connection with Figs. 5 to 11 inclusive.

In the present case, however, a sleeve 74 is rotatably mounted on the drive shaft 18, a spiral gear 75 being placed on the lower end of the sleeve 74. A split collar 76 is threaded onto an enlarged portion 77 on the shaft 18, which collar can be locked by means of a set bolt 78. By loosening up the set bolt and turning the collar 76 with respect to the shaft 18, said collar and also the sleeve 74 can be raised or lowered on the shaft.

The sleeve 74 carries a pair of diametrically opposite arms 79 to the upper end of which are pivoted the centrifugal wings 80 and 81 at the points 82 and 83 in a manner similar to that explained with reference to the previous construction.

In the present case the sleeve 84 is slidably mounted on the shaft 18 and can rotate with respect to said shaft, said sleeve 84 being connected to the fly balls 80 and 81 by the links 85 and 86.

The upper end of the sleeve 84 has an annular groove 87, as shown in Fig. 13, into which enters the inner end of a pin 88 on the lug block 89. This lug block 89 carries the lug 71 which engages either of the lugs 72 or 73 of the flange 70, and the lug block 89 is splined to the upper end of the shaft 18 by the key 90.

With this arrangement the rotation of the lug block 89 is equal in speed to the shaft 18 which in turn is driven by the engine. Consequently, the distributor block 29 will be driven at the proper engine speed. The speed of the centrifugal balls 80 and 81 is, however, dependent upon the speed of the spiral gear 75. This spiral gear is driven from another shaft 91 by means of another spiral gear 92. By connecting the shaft 91 with the propeller shaft which drives the drive wheels of the vehicle, or by connecting the shaft 91 directly to one of the vehicle wheels, its speed will be proportionate to that of the vehicle, so that the raising and lowering of the lug block will be accomplished by the changes of vehicle speed and not the engine speed.

While I have herein shown and described only certain embodiments of the features of my present invention, still I do not limit myself to the same, except as I may do so in the claims.

I claim:

1. A distributor for internal combustion engines comprising in combination a shaft, means for driving the same in timed relation with respect to the engine, a distributor head in alinement with said shaft and including timing block, said block being rotatively mounted with respect to the shaft, a sleeve splined to the shaft, a centrifugal governor on the shaft, an operative connection between said governor and said sleeve operative effectively to shift the sleeve on the shaft with change of speed of the shaft, and co-operating clutch elements on the sleeve and timing block operative effectively to establish a driving connection between the sleeve and the timing block when the shaft speed is lower than a pre-determined amount, said clutch elements disengaging from each other when the shaft speed exceeds said pre-determined amount, to destroy the correct operative connection aforesaid substantially as described.

2. A device of the class described including in combination a shaft whose speed is proportional to the speed of an engine to be controlled, a sleeve splined to such shaft, means for shifting the sleeve longitudinally of the shaft as the shaft speed changes, a distributor block rotatively mounted on the shaft, and co-operating lugs on the block and the sleeve operative effectively to establish two driving positions between the sleeve and the block, said driving positions being angularly separated from each other a substantial angular amount on the shaft, whereby in one position of the sleeve established by the governor a correct driving condition is established for the distributor block, and in another position of the sleeve on the shaft established by a higher speed of the governor another incorrect driving position is established for the block on the shaft substantially as described.

RAYMOND H. REECE.